(No Model.)
J. NIESE.
APPARATUS FOR EXTRACTING COFFEE.
No. 246,192.   Patented Aug. 23, 1881.
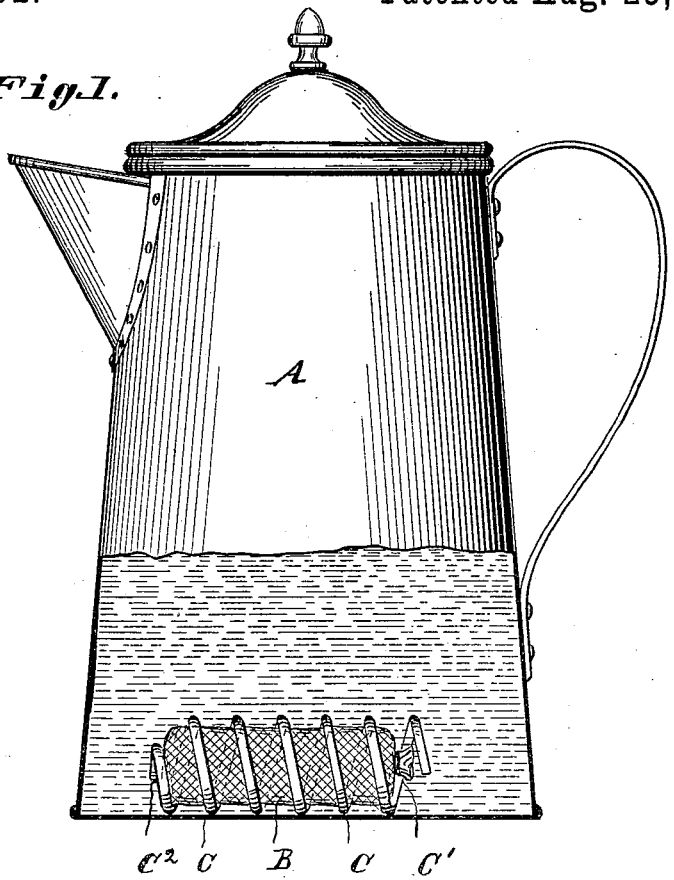
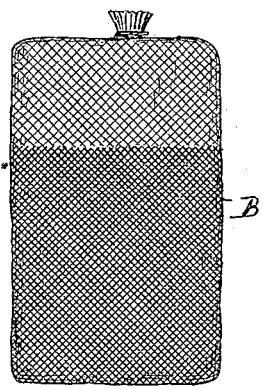
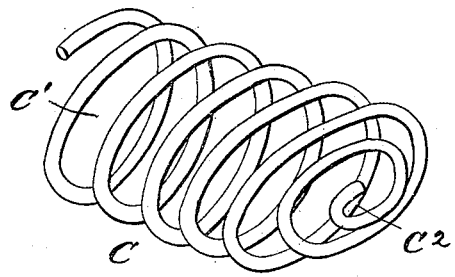
Attest:
John W. Herthel.
Charles Pickles
Inventor:
Julius Niese
per Herthel & Co.
N. PETERS. Photo-Lithographer, Washington, D. C.

UNITED STATES PATENT OFFICE.

JULIUS NIESE, OF ST. LOUIS, MISSOURI.

APPARATUS FOR EXTRACTING COFFEE.

SPECIFICATION forming part of Letters Patent No. 246,192, dated August 23, 1881.

Application filed May 24, 1881. (No model.)

*To all whom it may concern:*

Be it known that I, JULIUS NIESE, of St. Louis, in the State of Missouri, have invented a new and useful Improved Apparatus for Extracting Coffee, of which the following is a specification.

My invention relates to contrivances for the better extracting the essential principles of coffee without injury to the flavor or loss of the aroma.

It is well known that ordinarily the ground coffee is strained through a cloth or perforated metal strainer by the boiling water passing or percolating through said strainer, while the grounds are retained. This customary mode incurs a great loss of the flavor and aroma of the coffee, all of which it is the object of my invention to avoid. I attain these objects by the mechanism illustrated in the accompanying drawings, in which—

Figure 1 is a coffee-pot, the bottom portion thereof being shown in section to illustrate my contrivance for extracting the coffee. Fig. 2 is an elevation of a small bag for storing or keeping ground coffee; and Fig. 3 represents a perspective view of the contrivance employed to retain the ground coffee at the bottom of the pot, kettle, or can during the process of boiling the coffee.

Similar letters refer to similar parts throughout the several views.

A represents an ordinary coffee-pot.

The ground coffee to constitute any desired quantity of fluid coffee I first pack in a small cloth bag or sack, B. Swiss tulle is a very suitable material from which to make the bag. The bag B, so filled with coffee, has its open end fastened together by a string, or is kept closed in any well-known way, so as to confine the grounds. (See Figs. 1 and 2.)

C represents a piece of wire formed in spiral shape—that is to say, the spiral presents the opening at $C'$—and the opposite end, $C^2$, has its spiral end terminating in the center, all as clearly shown in Figs. 1 and 3. Through the opening $C'$ the small bag containing the ground coffee is inserted and placed in the spiral wire C. The end $C^2$ of the latter sufficiently retains the filled bag inside the spiral. (See Fig. 1.) The spiral C should be sufficiently heavy that it, together with its contained bag of coffee, shall remain at the bottom of the pot during the time the boiling water is applied. When so placed at the bottom of the coffee-pot the spiral C prevents the grounds from touching the bottom of the pot, and avoids burning action and the unwholesome effects arising from such a cause. The circulation of the water at the bottom of the pot is not impeded by the spiral weight C, and the grounds are freely subjected on all sides to the action of the applied boiling water, while the grounds are retained constantly at the bottom of the pot, thus insuring a more decided and perfect process of extracting from the grounds all flavor, strength, and aroma. The spiral C can always be reused when a fresh bag filled with grounds is to be used.

What I claim is—

The combination of coffee-pot A, the spiral C, having open end $C'$ and spiral termination $C^2$, the cloth bag or sack to contain ground coffee, by means whereof the latter is retained at the bottom of the pot by the weight of the spiral, which further permits free circulation of the boiling water to reach all sides of the retained grounds, as and for the purposes set forth.

In testimony of said invention I have hereunto set my hand.

JULIUS NIESE.

Witnesses:
WILLIAM W. HERTHEL,
JOHN M. HERTHEL.